(12) United States Patent
Black

(10) Patent No.: US 11,051,488 B2
(45) Date of Patent: Jul. 6, 2021

(54) DEER FEEDER POWER CONTROL AND DISTRIBUTION SYSTEM

(71) Applicant: Benjamin A. Black, Austin, TX (US)

(72) Inventor: Benjamin A. Black, Austin, TX (US)

( * ) Notice: Subject to any disclaimer, the term of this patent is extended or adjusted under 35 U.S.C. 154(b) by 237 days.

(21) Appl. No.: 16/147,571

(22) Filed: Sep. 28, 2018

(65) Prior Publication Data

US 2019/0274282 A1 Sep. 12, 2019

Related U.S. Application Data

(60) Provisional application No. 62/639,485, filed on Mar. 6, 2018.

(51) Int. Cl.
| *A01K 5/02* | (2006.01) |
| *G08C 17/02* | (2006.01) |
| *H04W 4/80* | (2018.01) |
| *A01K 61/80* | (2017.01) |

(52) U.S. Cl.
CPC .......... *A01K 5/0275* (2013.01); *A01K 5/0291* (2013.01); *A01K 61/80* (2017.01); *G08C 17/02* (2013.01); *H04W 4/80* (2018.02); *G08C 2200/00* (2013.01)

(58) Field of Classification Search
CPC . A01K 5/02; A01K 61/80; A01K 5/00; A01K 5/0225; A01K 5/0233; A01K 5/0241; A01K 5/0275; A01K 5/0283; A01K 5/0291
See application file for complete search history.

(56) References Cited

U.S. PATENT DOCUMENTS

| 10,278,363 | B2 * | 5/2019 | Ausman | A01K 5/0283 |
| 10,357,019 | B2 * | 7/2019 | Encarnacion | A01K 5/0225 |
| 10,517,267 | B2 * | 12/2019 | Gordon | A01K 5/0275 |
| 2014/0174368 | A1 * | 6/2014 | Salinas | A01K 5/0291 |
| | | | | 119/51.11 |
| 2016/0286755 | A1 * | 10/2016 | Feng | A01K 5/0291 |
| 2017/0223926 | A1 * | 8/2017 | Ausman | A01K 11/006 |
| 2018/0295807 | A1 * | 10/2018 | Hsu | A01K 5/0114 |
| 2018/0300662 | A1 * | 10/2018 | Lauve, IV | G06Q 10/1097 |
| 2019/0014742 | A1 * | 1/2019 | Leggett | A01K 5/0275 |
| 2019/0387735 | A1 * | 12/2019 | Wynn | A01M 31/002 |
| 2020/0253162 | A1 * | 8/2020 | Vachula | A01K 5/0291 |

* cited by examiner

*Primary Examiner* — Kristen C Hayes

(57) ABSTRACT

The invention provides an animal feeder augmentation apparatus, system and method of operation thereof. The apparatus provides for the controlled dispensing of animal feed from an animal feeder including a controller coupled to an actuator, where the controller provides power access from a battery to at least two communication modules, namely a low-power communications module and at least a first higher-power communications module. The low-power communication module includes a low-energy radio for substantially continuous operation when the animal feeder is being used. The first higher-power communications module includes a cellular telecommunications device for operation when the animal feeder needs to send or receive data outside of the range of the low-power communications module. The controller is coupled to the low-power communications module, and to the first higher-power communications module.

4 Claims, 4 Drawing Sheets

DEER FEEDER POWER CONTROL AND DISTRIBUTION SYSTEM

CLAIM OF PRIORITY AND REFERENCE TO RELATED APPLICATION

The invention is related to and claims priority from U.S. Provisional Patent Application No. 62/639,485 entitled DEER FEEDER POWER CONTROL AND DISTRIBUTION SYSTEM, filed on Mar. 18, 2018 and having common inventor Benjamin Black.

TECHNICAL FIELD

The invention generally relates to animal feeders, and more particularly to animal feeder data control and distribution systems.

PROBLEM STATEMENT AND HISTORY

Interpretation Considerations

This section describes technical field in detail and discusses problems encountered in the technical field. Therefore, statements in the section are not to be construed as prior art.

Discussion of History of the Problem and Definitions

Animal feeder systems (also called "game feeder systems," "deer feeder systems", "fish feeder systems," "bird feeder systems" or simply "feeder systems") allow users to control the dispensing of animal feed, such as deer feed (typically, but not necessarily, comprising corn) remotely. Often, feeder systems comprise at least two or more feed stations (individual "animal feeders," "feed stations," "feeder" or "animal feeder"), and are used to feed a wide variety of animals (also called "live stock").

Each feed station has a feed storage tank having an opening for dispensing feed (or other food), dispensing system that typically includes a dispenser coupled to the opening, an actuator coupled to a dispenser such that the actuator opens and shuts the dispenser to selectively allow feed to flow from the feed storage tank. A scatter plate is typically coupled to the feed storage tank through a dispensing system, and the feed station often includes a structure to lift the feed storage tank off the ground. More recently, remote control unit(s) have been added to feed stations. These units are able to articulate the scatter plate to control the dispensing of the feed, including, of course, deer feed.

Due in part to their remoteness, as well as the fact that they maintain a limited supply of a consumable product (which may include the feed), reliable continuous deer feeder systems in reality require constant supervision and maintenance and are not "set it and forget it" devices.

The result is a hunter or wildlife viewer may be frustrated when they spend a morning or afternoon returning to a location expecting animals to be present, but instead the animals have vanished because the feed station quit working. Equally frustrating, a hunter or wildlife viewer may be at or near a feed station, assuming that it is working properly, while animals simply walk by. For example, a deer may walk out of the visual range of a hunter because the feed that should be available to attract the deer is not dispensing from the feeder due to a malfunction, such as a loss of power at the deer feeder.

Topically Related Publications

US Patent Publication 2012/085,288 to Salinas et al discloses a remote animal feeding unit that dispenses animal feed at predetermined intervals. It includes a feed-level monitor and a battery charge sensor wherein data can be optionally acquired regarding feed level, battery status, feed jams or any other acquired data via a wireless communication module.

Also, US Patent Publication 2017/105,388 to Pfeiff discloses a control unit for a game or fish feeder. Pfeiff's control unit has a wireless transmitter that is arranged to communicate over a wireless network with a remote unit. A battery tester measures the capacity of the battery and a feed level sensor can provide a measure of the feed level in the feed container. The time of dispersing feed from the feeder system may be controlled via a control unit.

Similarly, US Patent Publication 2005/0284381 to Bell, et al. discloses a livestock facility equipment network having monitoring components, each configured to generate data associated with at least one of a number of monitored livestock facility devices. The data is communicated over a data communications network, whereby the data identifies a level of game feed.

However promising these solutions may seem to a casual observer, in the field they fail. There is simply no feeder system that is able to reliably maintain and dispense feed remotely, and one critical failure-point in these systems is their power-consumption. The present invention overcomes many of the failures of these and other existing feeder systems by, for example, providing unique forms of communication management.

SUMMARY

The invention provides an animal feeder augmentation apparatus, system and method of operation thereof. The apparatus provides for the controlled dispensing of animal feed from an animal feeder including a controller coupled to an actuator, where the controller provides power access from a battery to at least two communication modules, namely a low-power communications module and at least a first higher-power communications module. The low-power communication module includes a low-energy radio for substantially continuous operation when the animal feeder is being used. The first higher-power communications module includes a cellular telecommunications device for operation when the animal feeder needs to send or receive data outside of the range of the low-power communications module. The controller is coupled to the low-power communications module, and to the first higher-power communications module.

BRIEF DESCRIPTION OF THE DRAWINGS

Various aspects of the invention and its embodiment are better understood by referring to the following detailed description. To understand the invention, the detailed description should be read in conjunction with the drawings, in which.

DESCRIPTION OF AN EXEMPLARY PREFERRED EMBODIMENT

Interpretation Considerations

While reading this section (An Exemplary Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

Description of the Drawings, a Preferred Embodiment

Figure 1:
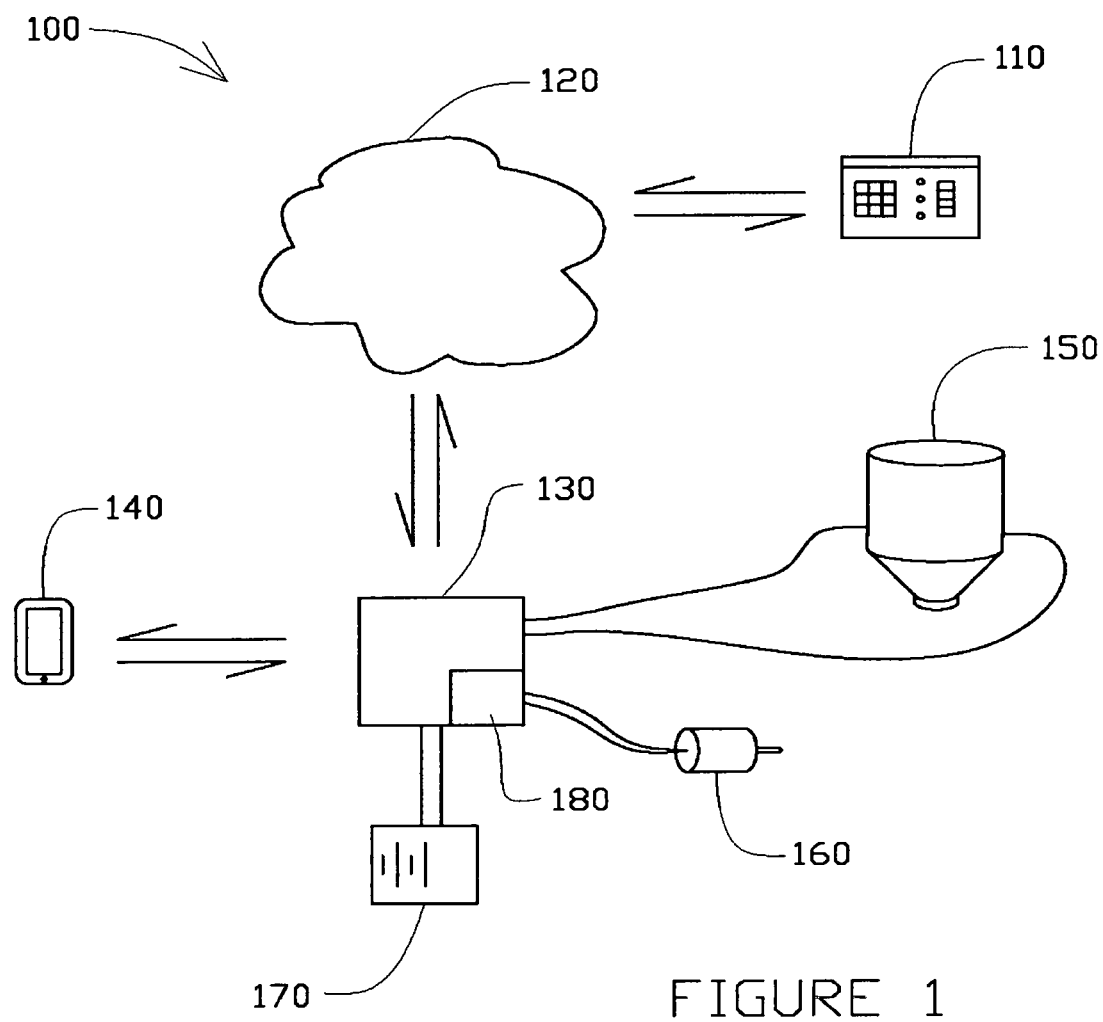
FIG. 1 illustrates a wireless deer feeder system configured according to the teaching of the invention.

FIG. 1 illustrates a wireless animal feeder system 100 configured according to the teachings of the invention. The wireless animal feeder system 100 comprises a web interface 110 coupled to an internet cloud service having a cloud server ("cloud server") 120. The web interface 110 allows a user to adjust settings, as well as to input/receive data regarding game feeders connected to the cloud server 120. Common settings controlled from the web interface 110 include feeding on/off, a feeding schedule (daily, times of day, times per day, etc.) and a feeding duration. Preferably, information is periodically (and/or at times set/customized by a user) sent to storage in the cloud server 120.

The web interface 110 may be a general computing device that executed specific software code to enable it to implement a method of controlling and communicating with devices coupled within the animal feeder system 100. Exemplary general computing devices include mobile telephones such as an iPhone™ or Android™ device, a laptop computer, desktop computer, or handheld RF Radio capable of DTMF (dual tone modular frequency) communication, and equivalents, for example. Additionally, the web interface may be a device specifically designed to communication only with an animal feeder system 100.

The cloud server 120, which is typically owned and maintained independently of other elements of the animal feeder system (such as by Amazon Web Services™ Microsoft Azure™, or Google Cloud Services™, for example) communicates wirelessly (such as WIFI or a cellular connection or other higher power communication method, for example) to a first controller 130. The controller 130 sends data to and receives user data from a mobile computing device 140 such as an Android® or iOS® based device or other wireless communication transceiver.

The controller 130 may independently provide an animal feeder augmentation apparatus. In one embodiment, the controller provides a means for powering a drive system such as a battery 170, solar power, an AC/DC power supply, or micro wind generator, for example. Shown in FIG. 1, the battery 170 provides electrical power to the controller 130, a motor 160 and a plurality of sensor(s) 150, and couples through the controller 130 to a memory 180, such as a micro-SD card, for storing data without cloud server 120 connectivity. The memory 180 may store historical data, method of operation (such as computer code, including artificial intelligence), data logging, and schedules for feeder actuation, among other digital items. More detail of the controller 130 and these related systems is provided in FIG. 3 and its corresponding discussion.

Exemplary mobile computing devices 140 include mobile telephones such as an iPhone™ or Android™ device, a laptop computer, or handheld RF Radio capable of DTMF (dual tone modular frequency) communication, and equivalents, for example. Either (or both) of the web interface 110 or the mobile computing device 140 may function as a control center, and either may communicate directly with the cloud server 120. In general, a control center has a memory, a processor coupled to the memory, and a control center higher-power communications module that is adapted to communicate with the animal feeder system 100.

The animal feeder system 100 may also include an animal feeder having a controller integrated with an animal feeder for storing and controllably dispensing animal feed. In this embodiment of the animal feeder system 100, the animal feeder comprises an integrated controller, where the controller for provides power access from a battery to the animal feeder including its dispensing system. The animal feeder comprising a low-power communications module, and a higher-power communications module. In this embodiment, the controller maintains default communications to and from the animal feeder via the low-power communications module, and temporarily places the animal feeder in a higher power state when the animal feeder needs to communicate outside the range capabilities of the low-power communications module.

The controller 130 combines user data with data received via at least one sensor 150 (herein described as a 'level sensor'; however, other sensors are known or foreseeable, such as temperature sensors, or humidity/moisture sensors, for example) to control a motor 160 which may be configured to articulate an opening in an animal feeder (not illustrated) to dispense animal feed, among other motor functions (in other embodiments, the motor spins (articulates) an actuator which dispenses food through an opening). Yet other sensors may also couple to the controller 130 to monitor battery voltage, other feed characteristics, tilt sensors, motor function, as well as collect and store via memory 180 (or other memory) historical data such as last feedings and the duration of time between feedings, the time that the feeder is open, and other time-domain functions.

The animal feeder system 100 optionally includes a second animal feeder having a second low-power communications module, the second animal feeder being communicatively coupled to the first animal feeder via a low-power signal, such as a Bluetooth low-energy signal (described in further detail below).

Figure 2:
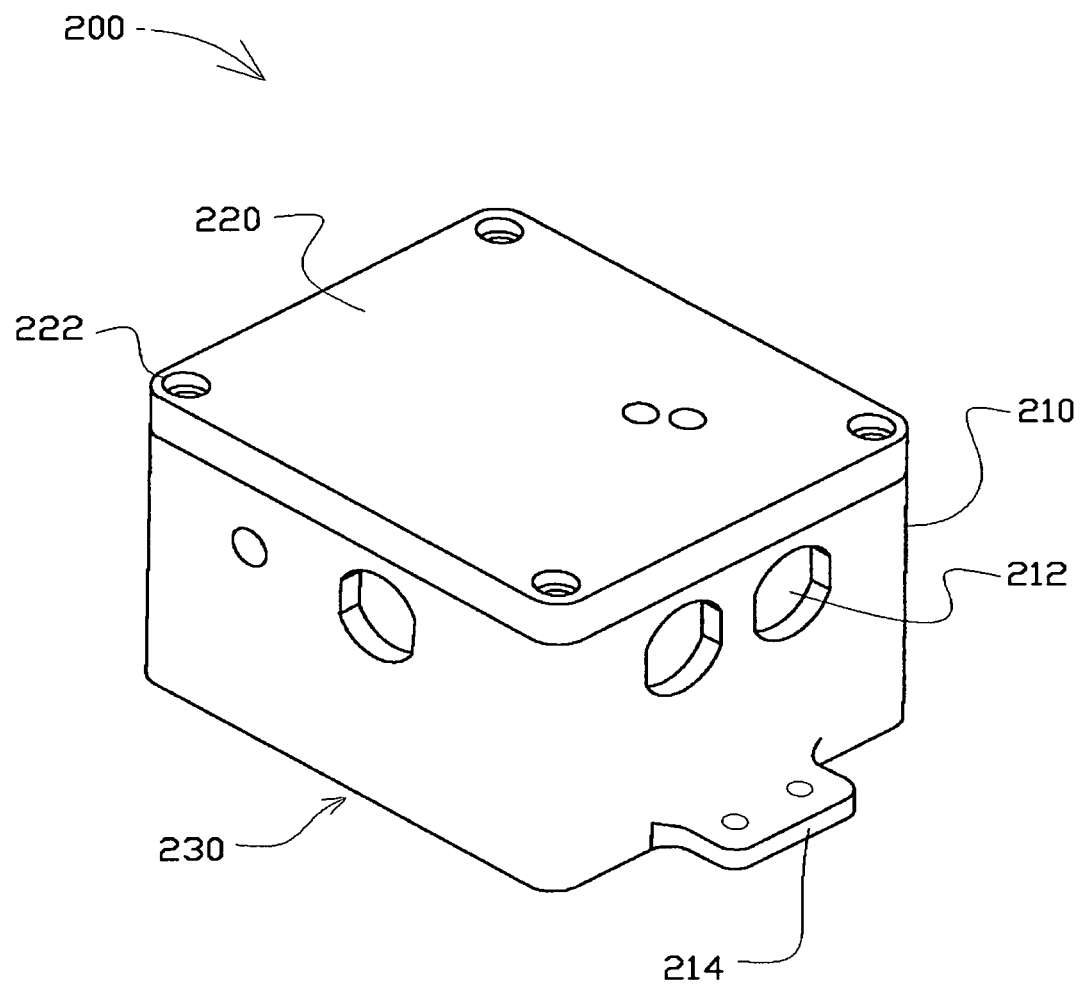
FIG. 2 illustrates an inventive environmentally resilient housing for the invention.

FIG. 2 illustrates an inventive environmentally resilient housing ("housing") 200 for the invention. Preferably, the housing is made of a cut or formed metal such as steel, but may also be constructed of other materials such as plastics. The housing 200 maintains the controller 130 and other electronics while providing for electrical coupling and communicative coupling to the other components of the feeder system 100.

The housing 200 includes a top cover 220, and a body 210 that has a unified base portion 230. The top cover 220 is coupled to the body 210 via four metal screws 222 that provide for easy removal/attachment of the top cover 220 to the body 210. The body 210 also includes a plurality of conduit holes 212 to provides a means for allowing a wire or a bundle of wires (not shown) to pass there-through. The body 210 further comprises a flange 214 proximate to the base 230 of the body 210; the flange 214 having holes therein for coupling the body to a surface, such as an animal feeder, or a stand for an animal feeder.

Figure 3:
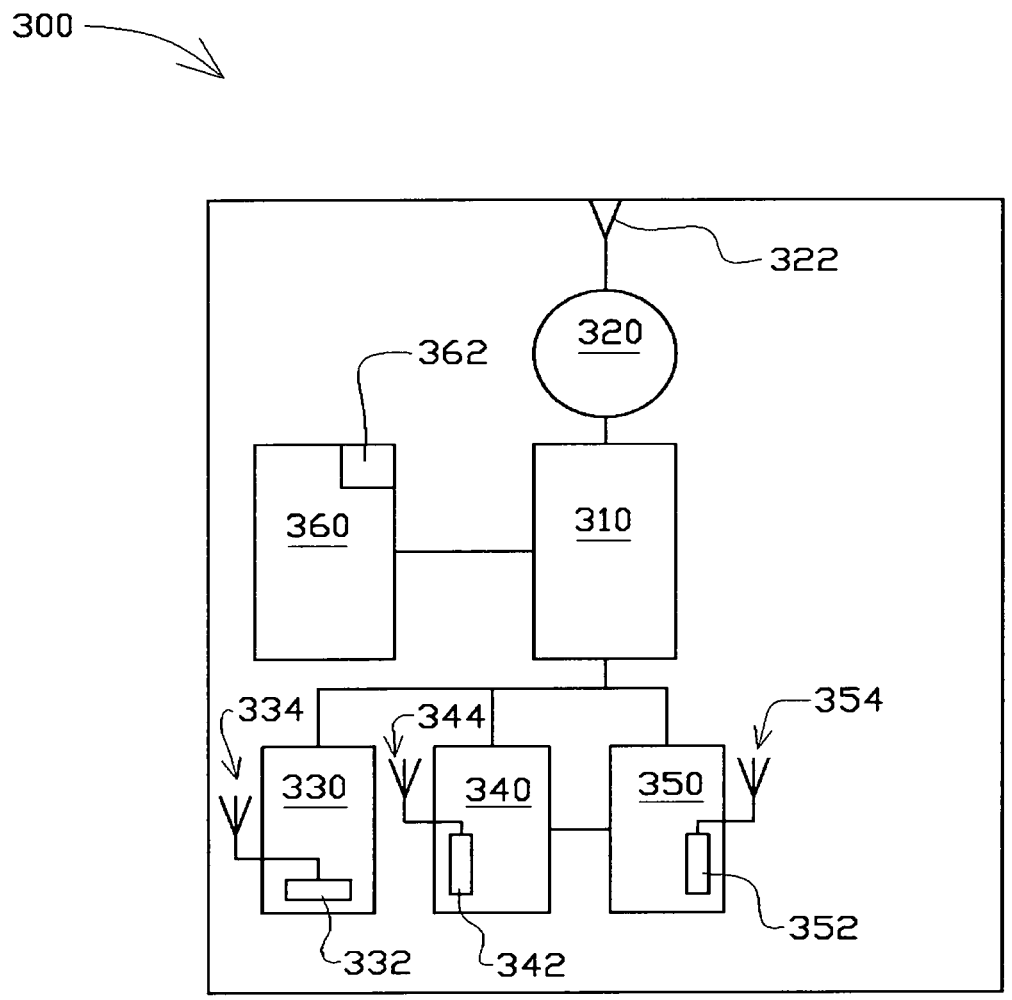
FIG. 3 illustrates a circuit block-diagram of one embodiment of the invention embodied as an animal feeder augmentation apparatus.

FIG. 3 illustrates a circuit block-diagram of one embodiment of the invention embodied as an animal feeder augmentation apparatus ("apparatus") 300. The apparatus 300 provides for the controlled dispensing of animal feed from an animal feeder, and includes a controller 310 coupled to motor driver 360 having an actuator 362, where the controller 310 provides power access from a power source 320. The controller 310 is coupled to at least two communication modules, namely a low-power communications module 330 and at least a first higher-power communications module 340.

The power source 320 may comprise a power storage source (preferably, a battery) and may also comprise a power-supply AC/DC convertor or the like. The power source 320 is optionally coupled to a power connector 322 which may be a DC port/plug inlet, an AC port/plug inlet, or other means of delivering power to the power source 320. Of course, power may be provided to the apparatus 300 via wind power, solar power, the electric grid, and/or other means known in the art.

Communications modules are organizations of circuitry and components that together enable the apparatus 300 to communicate with other devices, 'the cloud', or other data networks. A communications module may be either a defined part available from a number of suppliers, or a communications module may be 'virtual' in the sense that it is a collection of components and circuitry that can be integrated with other components and circuitry that make up the apparatus 300 (such as a sophisticated transceiver). This invention incorporates either (or both) of the embodiments of a communications module, as well as those that are foreseeable in the art. A "transceiver" may be defined broadly as a communication module or chip that sends and receives information. This invention incorporates either (or both) of the embodiments of a transceiver, as well as those that are foreseeable in the art.

The low-power communication module 330 includes a low-energy radio/transceiver ("low power transceiver") 332 for substantially continuous operation when the animal feeder is being used. Preferably, the transceiver 332 is a Bluetooth low-energy radio/Bluetooth low-power radio. A first antenna 334 is provided coupled to the low-power communications module 330 and is communicatively coupled to the low power transceiver 332.

The first higher-power communications module 340 preferably includes a telecommunications device embodied as a high-power radio/transceiver ("first high-power transceiver") 342 such as a cellular communications transceiver, a satellite communications transceiver, a data network enabled radio transceiver, or Wi-Fi Radio transceiver for example, for operation when the animal feeder needs to send or receive data outside of the range of the low-power communications module 332. A second antenna 344 is provided coupled to the high-power communications module 340 and is communicatively coupled to the first high-power transceiver 342.

The controller 310 is coupled to the low-power communications module 330, and to the first higher-power communications module 340, and any additional communications modules including a second higher-power communications module 350.

Accordingly, in alternative embodiments the apparatus 300 may also include the alternative second (or third, etc.) higher-power communications module 350, which may operate and communicate substantially similarly to the first higher-power communications module 340 to provide either redundant or augmented communications means. The second higher-power communications module 350 includes a second telecommunications device embodied as a second high-power radio/transceiver ("second high-power transceiver") 352 such as a cellular communications transceiver, a satellite communications transceiver, a data network enabled radio transceiver, or Wi-Fi Radio transceiver for example, for operation when the animal feeder needs to send or receive data outside of the range of the low-power communications module 332. A third antenna 354 is provided coupled to the high-power communications module 350 and is communicatively coupled to the second high-power transceiver 352.

The apparatus 300 may have additional optional equipment and functionality. For example, the low-power communications device 330 may be deactivated when one or more higher-power communications device(s) is active. Additionally, each communications module 330, 340, and 350 and/or the antennas 334, 344, 354, may be coupled to an external antenna (not shown but understood by those of skill in the art upon reading this disclosure), such as a high-power antenna, to provide better communication with other wireless-enables devices in an animal feeder system 100.

Preferably, yet optionally, a motor driver 360 comprising an actuator (not shown) may be coupled to the controller 310. In turn, the motor driver 360 may be communicatively coupled electronically or mechanically coupled via an actuator to a dispenser (not shown, but readily understood by those of ordinary skill in the animal feeder arts).

The inventive apparatus 300 may also further comprise an animal feeder including a dispensing system that accommodates a power source 320 coupled to each of the controller 310, the low-power communications module 30, the first high-power communications device 340.

Figure 4:
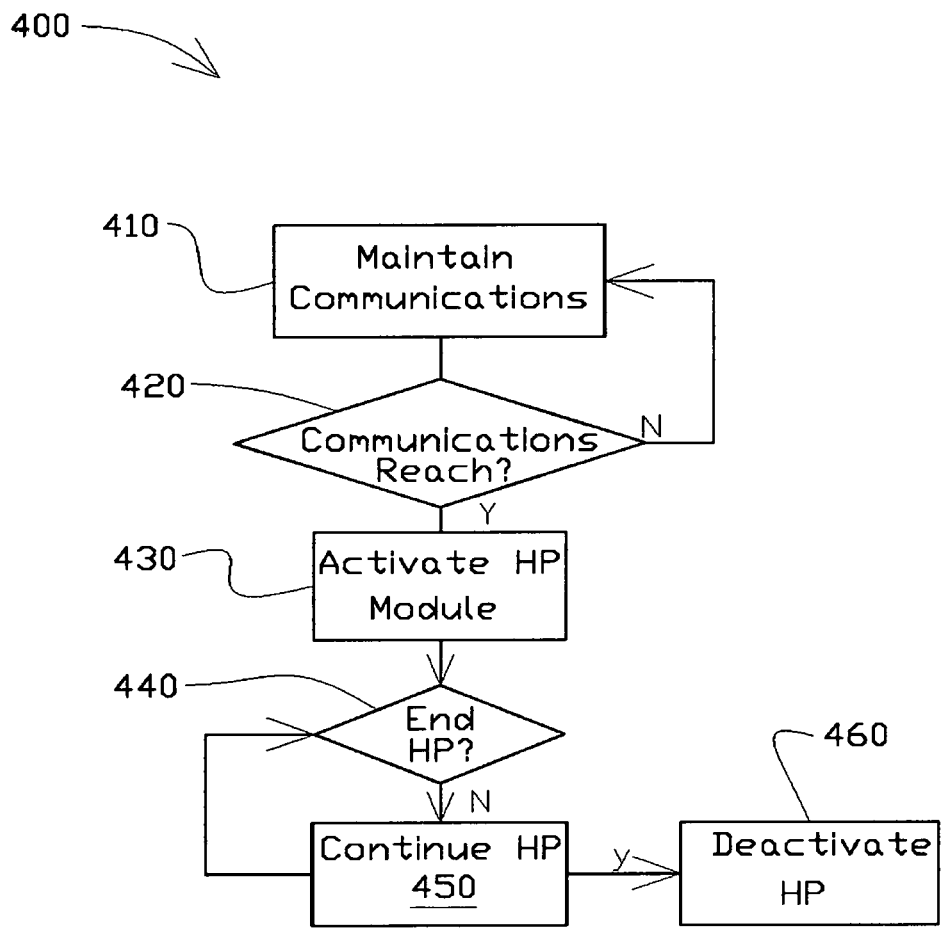
FIG. 4 illustrates a method of dispensing animal feed from an animal feeder having a controller.

As illustrated in FIG. 4, the invention is also a method 400 of dispensing animal feed from an animal feeder having a controller, a low-power communications module, and a higher-power communications module. The method 400 is preferably stored in memory and implemented via software maintained in the power controller.

The method 400 typically includes a first maintain communications act 410 whereby the animal feeder is directed to maintain communications to and from other animal feeder devices through a low-power communications module. Next, in a communications reach query 420, the method 400 determines whether or not there is a need for animal feeder communications to animal feeder devices that are beyond the range to communicate through the low-power communications module. If there are not any, then the method 400 returns through the "N" path to the first maintain communications act 410.

If the communications reach query 420 discovers a need to communicate with one or more devices that are beyond the range of the low-power communications module, then the method proceeds through the "Y" path to an activate higher-power communications module act ("Activate HP Module) 430 in which a higher-power communications module is temporarily activated.

Next, in an end higher-power ("End HP") query 440, the method 400 determines whether or not the animal feeder needs to communicate with devices that are beyond the range to communicate through the low-power communications module. If the End HP query 440 discovers a need to communicate with one or more devices that are beyond the range of the low-power communications module, then the method 400 proceeds through the "N" path to a continue higher-power communication act ("Continue HP") 450 in which the higher-power communications module continues to be temporarily activated and the method 400 returns to the End HP query 400.

If, however, the End HP query 440 discovers that a need to communicate with one or more devices that are beyond the range of the low-power communications module is no longer present, then the method 400 proceeds through the "Y" path to a deactivate higher-power communication act ("Deactivate HP") 460 in which the higher-power communications module is deactivated.

Alternatively, the method 400 may cause the controller to actuate an actuator that articulates a feed dispenser in a articulate dispenser act. Additionally, in an data communications act, the method 400 may cause a communications module to sending an animal feeder information comprising a schedule, a status, an amount of food to be dispensed, an alert, an order to go into a sleep state, a fault detection, a power state such as a battery charge state, weather information, GPS location information, or stored (historical) data, for example. Of course, sensors are needed to detect the status of each of these conditions and sensors having such detection abilities are incorporated within the scope of the invention.

In one alternative embodiment, the invention uses a cellular or Wi-Fi radio to connect the feeder to a server in the cloud that monitors the status of the feeder (battery level, feed level, schedule for triggering the feed times, etc.). A Bluetooth low energy (BLE) radio (or other communication protocol) that connects locally to an App on a computer or cell phone and provides direct control of the feeder and access to the status of all of the important parameters. Computer code running on the embedded device wakes up the system once per day to upload the status to the cloud and then wakes it up again for each programmed feeding time. The computer code also connects locally to an app on a phone or computer to either trigger the device to dispense feed, update the feeding times or check the status (battery level, feed level, etc). The device can be used on wildlife feeders, livestock feeders or any other similar motor-driven or gravity-driven feeder device. Enclosures are adapted to be bolted on to the outside of an existing feeder or go inside another enclosure.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

I claim:

1. An animal feeder augmentation apparatus that provides for the controlled dispensing of animal feed from an animal feeder, comprising:
   a controller providing power access from a battery to at least two communication modules;
   a low-power communication module comprising a low-energy radio for substantially continuous operation when the animal feeder is being used;
   a first higher-power communications module comprising a telecommunications device for operation when the animal feeder needs to send or receive data outside of the range of the low-power communications module;
   the controller coupled to the low-power communications module;
   the controller also coupled to the first higher-power communications module; and
   the low-power communications device is deactivated when the first higher-power communications device is active.

2. An animal feeder augmentation apparatus that provides for the controlled dispensing of animal feed from an animal feeder, comprising:
   a controller providing power access from a battery to at least two communication modules;
   a low-power communication module comprising a low-energy radio for substantially continuous operation when the animal feeder is being used;
   a first higher-power communications module comprising a telecommunications device for operation when the animal feeder needs to send or receive data outside of the range of the low-power communications module;
   the controller coupled to the low-power communications module;
   the controller also coupled to the first higher-power communications module; and
   an animal feeder, the animal feeder having:
      a feed storage tank having an opening for dispensing feed,
      a dispensing system comprising a dispenser coupled to the opening, and an actuator coupled to the dispenser, the actuator opens and shuts the dispenser to selectively allow feed to flow from the food storage tank;
   the feed storage tank is coupled to a scatter plate via the dispensing system; and
   the dispensing system comprises a power source coupled to each of the controller, the low-power communications device, the first high-power communications device, and the actuator that is coupled to the dispenser.

3. A method of dispensing animal feed from an animal feeder having a controller, a low-power communications module, and a higher-power communications module, the method implemented via software maintained in the power controller, the method comprising:
    maintaining animal feeder communications to and from other animal feeder devices through a low-power communications module;
    determining that there is a need for animal feeder communications to animal feeder devices that are beyond the range to communicate through the low-power communications module;
    activating a higher-power communications module;
    temporarily activating the higher-power communications module;
    determining that the animal feeder no longer needs to communicate to devices that are beyond the range to communicate through the low-power communications module; and
    deactivating the higher-power communications module.

4. The method of claim 3 further comprising actuating an actuator that articulates a feed dispenser.

\* \* \* \* \*